United States Patent
Mizusawa

(10) Patent No.: US 10,308,297 B2
(45) Date of Patent: Jun. 4, 2019

(54) ELASTIC CRAWLER DRIVE MECHANISM

(71) Applicant: BRIDGESTONE CORPORATION, Chuo-ku, Tokyo (JP)

(72) Inventor: Takashi Mizusawa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 123 days.

(21) Appl. No.: 15/531,556

(22) PCT Filed: Nov. 4, 2015

(86) PCT No.: PCT/JP2015/005530
§ 371 (c)(1),
(2) Date: May 30, 2017

(87) PCT Pub. No.: WO2016/092739
PCT Pub. Date: Jun. 16, 2016

(65) Prior Publication Data
US 2017/0327163 A1 Nov. 16, 2017

(30) Foreign Application Priority Data
Dec. 12, 2014 (JP) .................................. 2014-252371

(51) Int. Cl.
*B62D 55/12* (2006.01)
*B62D 55/24* (2006.01)
*B62D 55/125* (2006.01)

(52) U.S. Cl.
CPC .............. *B62D 55/24* (2013.01); *B62D 55/12* (2013.01); *B62D 55/125* (2013.01); *B62D 55/244* (2013.01)

(58) Field of Classification Search
CPC ...... B62D 55/12; B62D 55/125; B62D 55/24; B62D 55/244
See application file for complete search history.

(56) References Cited

U.S. PATENT DOCUMENTS 4,147,069 A * 4/1979 Derner ...................... F16G 1/28
474/204
9,545,964 B2 * 1/2017 Shimozono ............ B62D 55/12
(Continued)

FOREIGN PATENT DOCUMENTS

| CN | 102712343 A | 10/2012 |
|----|-------------|---------|
| CN | 103492258 A | 1/2014 |

(Continued)

OTHER PUBLICATIONS

Oct. 27, 2017, Search Result of the Extended European Search Report issued by the European Patent Office in the corresponding European Patent Application No. 15867490.3.
(Continued)

*Primary Examiner* — Kip T Kotter
(74) *Attorney, Agent, or Firm* — Kenja IP Law PC

(57) ABSTRACT

This disclosure is to provide an elastic crawler drive mechanism including an elastic crawler (20) with engaging portions (22) disposed on an endless belt (21), and a sprocket (10) having teeth (12), wherein: engaging surfaces (F2) of the engaging portions (22) have flat engaging planes (22*b*) in contact with a part of tooth surfaces (F1) of the sprocket (10) when in contact with tooth bottom surfaces (11*a*) of the sprocket (10), and when the engaging portions (22) are in contact with the tooth bottom surfaces (11*a*), and simultaneously the engaging planes (22*b*) are in contact with the tooth surfaces (F1) of the sprocket (10), at least one of the tooth surfaces (F1) of the sprocket (10) and the engaging planes (22*b*) of the engaging portions (22) form gaps (C) between the tooth surfaces (F1) and the engaging planes (22*b*), on sides closer to the tooth bottom surfaces (11*a*) than contact portions (P) of the tooth surfaces (F1) and the engaging planes (22*b*).

21 Claims, 4 Drawing Sheets

(56) References Cited

U.S. PATENT DOCUMENTS

| | | | | |
|---|---|---|---|---|
| 2010/0013298 A1* | 1/2010 | Sugihara | ................ | B62D 55/12 |
| | | | | 305/178 |
| 2014/0042801 A1* | 2/2014 | Shimozono | ............ | B62D 55/12 |
| | | | | 305/165 |

FOREIGN PATENT DOCUMENTS

| | | | | |
|---|---|---|---|---|
| EP | 2554457 A1 | 2/2013 | | |
| JP | 2010047173 A | 3/2010 | | |
| JP | 2011105128 A | 6/2011 | | |
| JP | 5523799 B2 | 6/2014 | | |
| JP | 2014162311 A | 9/2014 | | |
| JP | 2014162312 A | 9/2014 | | |
| WO | WO-2011121809 A1 * | 10/2011 | ........... | B62D 55/125 |

OTHER PUBLICATIONS

Oct. 18, 2018, search result of Office Action issued by the State Intellectual Property Office in the corresponding Chinese Patent Application No. 201580067584.7.

* cited by examiner

ELASTIC CRAWLER DRIVE MECHANISM

TECHNICAL FIELD

This disclosure relates to an elastic crawler drive mechanism.

BACKGROUND

Known is a drive mechanism for engaging sprocket teeth to engaging portions of cores, etc. of an elastic crawler, to drive the elastic crawler (see, e.g., PTL1).

CITATION LIST

Patent Literature

PTL1 JP2010047173A

SUMMARY

Technical Problem

However, in a conventional drive mechanism, sliding contact (contacting while dragging each other) occurs right before completion of engagement of sprocket teeth and cores or right after initiation of release of the engagement, and thus abrasion is likely to occur on tooth root portions of the sprocket and the engaging portions of the cores.

This disclosure is to provide an elastic crawler drive mechanism excellent in durability due to suppression of abrasion occurrence of elastic crawler and sprocket.

Solution to Problem

The elastic crawler drive mechanism according to this disclosure comprises an elastic crawler with a plurality of engaging portions disposed on an endless belt with elasticity, and a sprocket having a plurality of teeth engageable with the engaging portions of the elastic crawler, wherein:

the engaging portions of the elastic crawler have flat engaging planes in contact with a part of tooth surfaces of the sprocket when the engaging portions come into contact with tooth bottom surfaces of the sprocket, and when the engaging portions are in contact with the tooth bottom surfaces, and simultaneously the engaging planes of the engaging portions are in contact with the tooth surfaces of the sprocket, the tooth surfaces of the sprocket and the engaging planes of the engaging portions form gaps between the tooth surfaces of the sprocket and the engaging planes of the engaging portions, on sides closer to the tooth bottom surfaces of the sprocket than contact portions of the engaging planes of the engaging portions and the tooth surfaces of the sprocket.

According to the elastic crawler drive mechanism of this disclosure, the durability is excellent due to suppression of abrasion occurrence of elastic crawler and sprocket.

Advantageous Effect

According to this disclosure, it is possible to provide an elastic crawler drive mechanism excellent in durability due to suppression of abrasion occurrence of elastic crawler and sprocket.

BRIEF DESCRIPTION OF THE DRAWINGS

In the accompanying drawings:

FIG. 4 is a schematic side view showing a generative method of the tooth shape of the sprocket of FIG. 1, where

DETAILED DESCRIPTION

Figure 1:
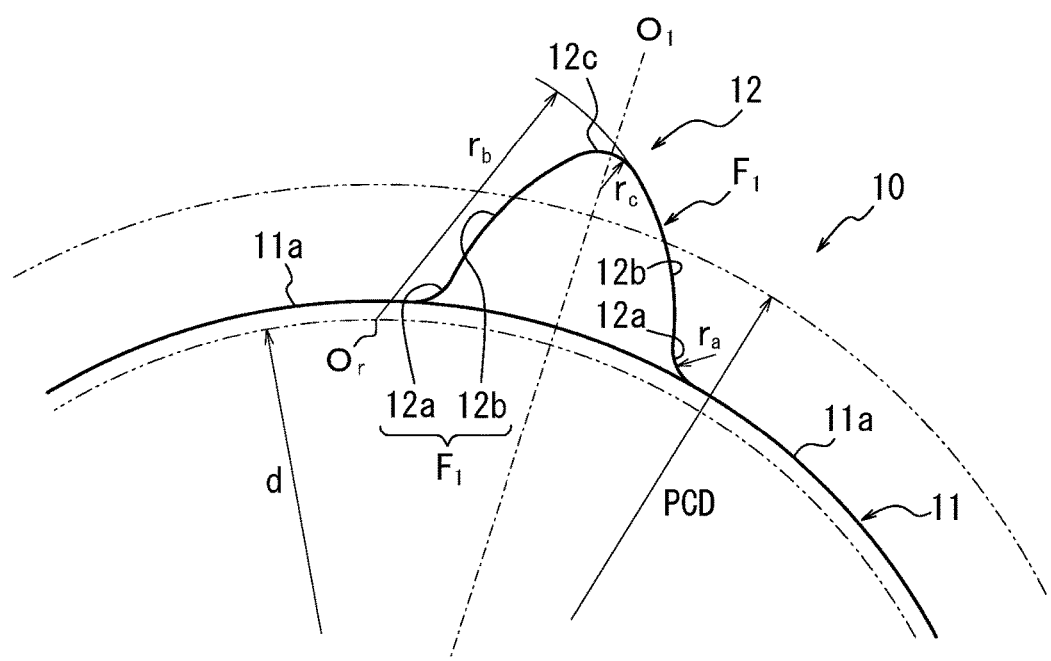
FIG. 1 illustrates an example for the sprocket used in the elastic crawler drive mechanism according to one embodiment of this disclosure, and is a schematic side view of one tooth enlarged among the plurality of teeth disposed on the sprocket.

In the following, the elastic crawler drive mechanism according to one embodiment of this disclosure is described by referring to the drawings. In the following description, the "width direction of the elastic crawler" is synonymous to the width direction of the endless belt, and the term "circumferential direction of the elastic crawler" is synonymous to the circumferential direction of the endless belt as well.

In FIG. 1, the reference sign 10 is the sprocket used in the elastic crawler drive mechanism 100 according to one embodiment of this disclosure. The sprocket 10 has a disk 11 as a rotation member, and a plurality of teeth 12 (merely one tooth 12 illustrated in the drawing) arranged at a spacing in the circumferential direction of the disk 11. In the present embodiment, an outer circumferential surface 11a of the disk 11 forms the shape of a tooth bottom surface (hereinafter referred to as "the tooth bottom surface 11a" as well).

Further, in the present embodiment, as illustrated in FIG. 1, when the sprocket 10 is seen from the side, each of the teeth 12 has outline shape symmetrical with respect to a line $O_1$ extending radially from a center of the disk 11 and has two tooth surfaces $F_1$ tapered from the tooth bottom surfaces 11a to a tooth top surface 12c, with the axis (hereinafter referred to as "the central axis" as well) $O_1$ sandwiched therebetween. The two tooth surfaces $F_1$ are connected with each other via the tooth top surface 12c.

In the present embodiment, the two tooth surfaces $F_1$ respectively have a tooth root surface 12a connected with the tooth bottom surface 11a. In the present embodiment, when seen from the side, tooth root surfaces 12a respectively have an outline shape of a curved surface recessed from the tooth bottom surface 11a to the inner side of the tooth 12 (the central line $O_1$ side of the tooth 12). The tooth root surfaces 12a respectively have a shape with wide end smoothly connected with the tooth bottom surface 11a. In the present embodiment, when seen from the side, the tooth root surfaces 12a respectively have the outline shape of the curved surface with a radius of curvature $r_a$. The radius of curvature $r_a$ may be any value, but is preferably, e.g., within a range of 3 mm or more and 10 mm or less (3 mm≤$r_a$≤10 mm). The specific radius of curvature $r_a$ is exemplified as $r_a$=5 mm.

In the present embodiment, the two tooth surfaces $F_1$ respectively have an engaging tooth surface 12b connected with the tooth root surface 12a. As illustrated in FIG. 1, engaging tooth surfaces 12b of the teeth 12 are respectively curved surfaces protruding from the tooth root surfaces 12a to the outer side of the tooth 12 (the side opposite to the central line $O_1$ of the tooth 12). In the present embodiment, the shapes of the engaging tooth surfaces 12b are formed as curved surfaces with a radius of curvature $r_b$. The radius of curvature $r_b$ may be within a range of 40 mm or more and 150 mm or less (40 mm≤$r_b$≤150 mm). The specific radius of curvature $r_b$ is exemplified as $r_b$=45.86 mm.

More specifically, the engaging tooth surfaces 12b of the sprocket 10 may be defined with the following relation expressions (1), (2).

The centers $O_r$ (hereinafter referred to as "the tooth shape center $O_r$," as well) of the radius of curvature $r_b$ for forming the shapes of the engaging tooth surfaces 12b exist on a virtual circle with a diameter d, which is concentric with the center of the sprocket 10 (the disk 11). The diameter of this virtual circle (hereinafter referred to as "the virtual circle diameter" as well) d may be defined with the following relation expression (1).

$$d = a \times \text{PCD} \quad (1)$$

Here, "a" is a first coefficient of any value.

Moreover, "PCD" is a pitch circle diameter (hereinafter referred to as "the pitch circle diameter PCD" as well) (mm). In the present embodiment, the pitch circle diameter PCD may be defined with the following relation expression.

$$\text{PCD} = \text{tooth number} \times \text{core pitch}/P1 \quad (2)$$

Here, the core pitch refers to the pitch of the cores 22 in the circumferential direction of the elastic crawler 20, which is different from the spacing between adjacent cores 22. Specifically exemplified is PCD=229.3 mm, where core pitch=90 mm, tooth number=8, P1=π. In this case, when a=0.82, according to expression (1), the diameter d of the virtual circle is d=188.26 mm. By using the PCD as a standard, even if the sizes of the entire sprocket 10 are varied, it is possible to obtain a desired shape of the teeth 12.

Further, the radius of curvature $r_b$ may be defined with the following relation expression (3).

$$r_b = \text{PCD} \times b \quad (3)$$

Here, "b" is a second coefficient of any value.

In this case, since PCD=229.3 mm is determined from the relation expression (2), when b=0.2, according to expressions (1) and (3), the radius of curvature $r_b$ is $r_b$=45.86 mm.

Namely, in the present embodiment, as illustrated in FIG. 1, when seen from the side, the outline shapes of the engaging tooth surfaces 12b of the teeth 12 of the sprocket 10 are arcuate shapes, which are formed into a shape with a radius of curvature $r_b$ (=45.86 mm), so as to have a tooth shape center $O_r$ on a virtual circle with a virtual circle diameter d (=188.26 mm).

In the present embodiment, tooth top surfaces 12c are curved surfaces protruding to the outer sides of the teeth 12. In the present embodiment, the shapes of the tooth top surfaces 12c are formed as curved surfaces with a radius of curvature $r_c$, so as to connect the two engaging tooth surfaces 12b. The radius of curvature $r_c$ may be any value, but is preferably, e.g., within a range of 5 mm or more and 15 mm or less (5 mm≤$r_c$≤15 mm). The specific radius of curvature $r_c$ is exemplified as $r_c$=10 mm.

Figure 2:
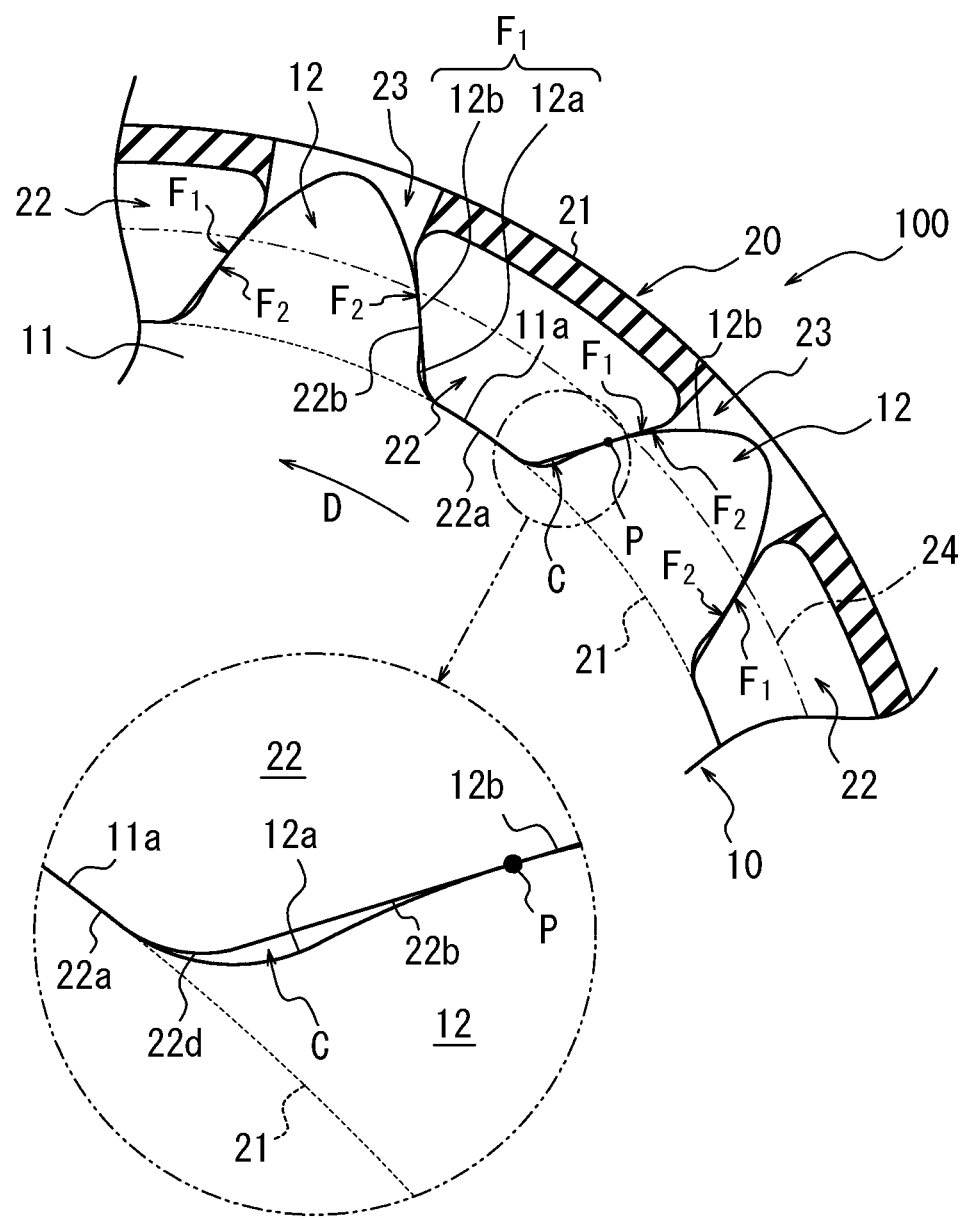
FIG. 2 illustrates the elastic crawler drive mechanism using the sprocket of FIG. 1 according to one embodiment of this disclosure, and illustrates a schematic cross-sectional view of the engaging portions of the elastic crawler and the sprocket according to this drive mechanism, and its enlarged cross-sectional view.

In FIG. 2, the reference sign 100 is an elastic crawler drive mechanism using the sprocket 10 of FIG. 1 according to one embodiment of this disclosure. The reference sign 20 is an elastic crawler with cores incorporated. The elastic crawler 20 has a plurality of cores (engaging portions) 22 disposed on the endless belt 21 with elasticity. The endless belt 21 is an annular member without end portions. In the present embodiment, the endless belt 21 is obtained via, e.g., vulcanization forming of rubber materials. The cores 22 are disposed at intervals in the circumferential direction on the inner circumference side of the endless belt 21. In the present embodiment, on the endless belt 21, a plurality of storage portions 23 are formed at intervals in the extension direction of the endless belt 21. Other than penetrating holes as illustrated, the storage portions 23 may be cavities as well. Moreover, the elastic crawler 20 according to the present embodiment has a main cord layer 24 arranged inside the endless belt 21. The main cord layer 24 is formed by arranging a plurality of steel cords circling around the endless belt 21 separately in the width direction. Here, a plurality of lugs are ordinarily disposed on the outer circumferential surface of the endless belt 21 of the elastic crawler 20, but are omitted in the present embodiment.

Figure 3A:
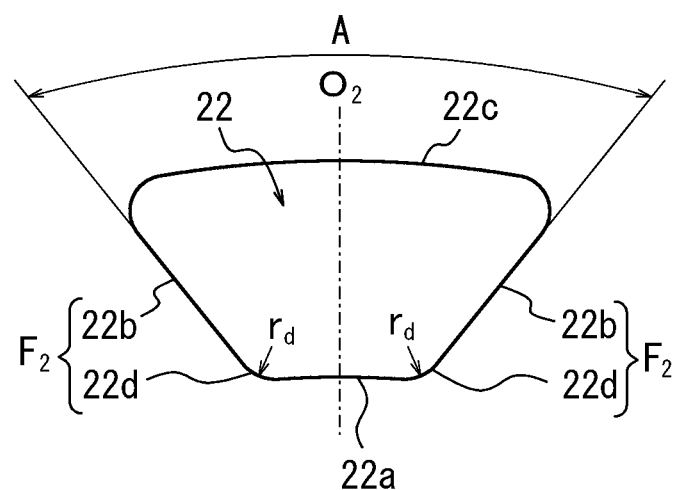
FIG. 3A illustrates a schematic cross-sectional view of a core as an example for the engaging portions which is engaged with the sprocket of FIG. 1.

As illustrated in FIG. 3A, the cores 22 respectively have a top surface 22a, engaging surfaces $F_2$ and a bottom surface 22c, and extend in the width direction of the elastic crawler 20 (the front-rear direction of the drawing). The cores 22 are formed of metal materials such as iron and the like, which are formed via casting or forging, and are fixed on the inner circumferential side of the endless belt 21 by using vulcanization adhesion, etc. In the present embodiment, as illustrated in FIG. 3A, when seen from the side, each of the cores 22 has cross-sectional outline shape symmetrical with respect to central line (line bisecting the top surface 22a of the core 22 in a rotation direction (travelling direction) of the elastic crawler 20) $O_2$ of each core 22. Moreover, as illustrated in FIG. 2, bottom surfaces 22c of the cores 22 are arranged so as to be sunk into the outer circumference side of the endless belt 21, and top surfaces 22a are arranged on the inner circumferential side of the endless belt 21.

As illustrated in FIG. 3A, in the present embodiment, when seen from the side, the cores 22 have cross-sectional outline shapes tapered from the bottom surfaces 22c to the top surfaces 22a. Further, as illustrated in FIG. 3A, the engaging surfaces $F_2$ respectively have a flat engaging surface (hereinafter referred to as "the engaging plane" as well) 22b extending in the width direction of the elastic crawler 20, of which the cross-sectional outline shape is linear when seen from the side. In the present embodiment, the engaging planes 22b are respectively a flat surface with linear outline shape, which are inclined with respect to the central line $O_2$ of the core 22, so as to approach the central line $O_2$ of the core 22 as moving toward the top surface 22a. The angle (hereinafter referred to as "the core opposite surface angle" as well) A of the two engaging planes 22b is exemplified as A=70°, A=60°, A=50°, etc.

In the present embodiment, the engaging surfaces $F_2$ have corner surfaces 22d connected with the top surfaces 22a. When seen from the side, each of the corner surfaces 22d has a cross-sectional outline shape formed of curved surface protruding toward the outer side of the core 22 (the side opposite to the central line $O_2$ of the core 22). In the present embodiment, the two corner surfaces 22d are respectively formed of curved surface with a radius of curvature $r_d$. The radius of curvature $r_d$ may be within a range of 3 mm or more and 10 mm or less (3 mm≤$r_d$≤10 mm) with respect to the central line $O_2$ of the core 22. The specific radius of curvature $r_d$ is exemplified as $r_d$=5 mm. Further, in the present embodiment, each of the top surfaces 22a is a flat surface perpendicular to the central line $O_2$ of the core 22.

Hereinafter, the elastic crawler drive mechanism 100 according to the present embodiment is described by mainly using FIG. 2. In FIG. 2, the rotation direction when the sprocket 10 rotates counterclockwisely is referred to as the travelling rotation direction D. Moreover, among the two teeth 12 of the sprocket 10, the tooth 12 arranged on the left side of the drawing is referred to as the tooth on the left side (the tooth on the forward rotation direction side), and the tooth 12 arranged on the right side of the drawing is referred to as the tooth on the right side (the tooth on the backward rotation direction side). Further, among the two tooth surfaces $F_1$ of each tooth 12, the tooth surface $F_1$ arranged on the left side of the drawing is referred to as the tooth surface $F_1$ on the forward rotation direction side, and the tooth surface $F_1$ arranged on the right side of the drawing is referred to as the tooth surface $F_1$ on the backward rotation direction side. Next, among the engaging surfaces $F_2$ of the cores 22, the engaging surface $F_2$ arranged on the left side of the drawing is referred to as the engaging surface $F_2$ on the left side, and the engaging surface $F_2$ arranged on the right side of the drawing is referred to as the engaging surface $F_2$ on the right side.

In the present embodiment, as illustrated in FIG. 2, when the elastic crawler 20 is wound onto the sprocket 10, the teeth 12 of the sprocket 10 are storaged in the storage portions 23 formed on the endless belt 21 of the elastic crawler 20, while the cores 22 of the elastic crawler 20 are storaged in tooth grooves between two teeth 12. In the present embodiment, when rotating the sprocket 10 in the forward rotation direction D to drive the elastic crawler 20, in the sprocket 10, mainly the tooth surfaces $F_1$ on the forward rotation direction side of the teeth 12 on the right side are engaged with the engaging surfaces $F_2$ on the right side of the cores 22.

In the present embodiment, when the elastic crawler 20 is wound onto the sprocket 10 and driven, as illustrated in the enlarged cross-sectional view of FIG. 2, the top surfaces 22a of the cores 22 come into contact with the tooth bottom surfaces 11a of the sprocket 10, and simultaneously, as illustrated in the general view of FIG. 2, at least one engaging surface $F_2$ of the core 22 comes into contact with a part of the tooth surface $F_1$ of the tooth 12 of the sprocket 10. At this time, the tooth surface $F_1$ of the tooth 12 of the sprocket 10 and the engaging surface $F_2$ of the core 22 of the elastic crawler 20 form a gap C between the tooth surface $F_1$ of the tooth 12 of the sprocket 10 and the engaging surface $F_2$ of the core 22 of the elastic crawler 20, on the side closer to the tooth bottom surface 11a of the sprocket 10 than the contact portion P of the tooth surface $F_1$ of the sprocket 10 and the engaging surface $F_2$ of the core 22.

Here, the effect of the elastic crawler drive mechanism 100 is described more specifically.

Figure 3B:
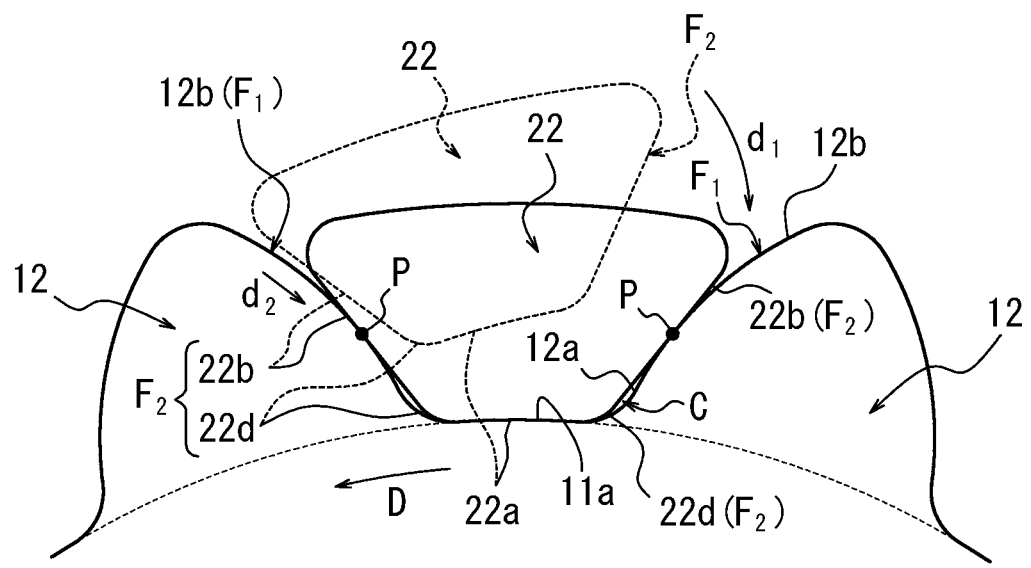
FIG. 3B illustrates a schematic analysis of a track of the core when the sprocket rotates in one direction in the elastic crawler drive mechanism of FIG. 2.

FIG. 3B illustrates the track of the core 22 with respect to the sprocket 10 when rotating the sprocket 10 in the forward rotation direction D, to drive the elastic crawler 20. When the sprocket 10 is rotated in the forward rotation direction D, the elastic crawler 20 is wound onto the sprocket 10, and thereby, the core 22 of the elastic crawler 20 draws an involute curve from the left side of the drawing, and simultaneously enters perpendicularly into the tooth groove formed between the two teeth 12 of the sprocket 10 along the arrow $d_1$.

In the present embodiment, a part of the engaging surfaces $F_2$ of the cores 22 are the flat engaging surfaces 22b, and a part of the tooth surfaces $F_1$ of the teeth 12 of the sprocket 10 form the engaging tooth surfaces 12b curved toward the outer sides. In this case, simultaneously with winding the elastic crawler 20, the cores 22 move along the involute curves, and the engaging surfaces $F_2$ (engaging planes 22b) on the left side of the cores 22 come into contact with the tooth surfaces $F_1$ (the engaging tooth surfaces 12b) on the backward rotation direction side of the teeth 12 on the left side of the sprocket 10. Then, the cores 22 of the elastic crawler 20 move so as to roll in the direction shown with the arrow $d_2$, on the engaging tooth surfaces 12b on the backward rotation direction side of the teeth 12 on the left side of the sprocket 10. Thereby, as the elastic crawler 20 being wound onto the sprocket 10, the cores 22 enter the tooth grooves along the tooth surfaces $F_1$ of the teeth 12 on the left side of the sprocket 10, in a manner such that their top surfaces 22a become parallel with respect to the tooth bottom surfaces 11a of the sprocket 10.

In this way, due to the contact of the top surfaces 22a of the cores 22 with the tooth bottom surfaces 11a of the teeth 12 of the sprocket 10, the elastic crawler 20 is firmly wound onto the sprocket 10. Furthermore, when the sprocket 10 further rotates to the rotation direction D side, the engaging tooth surfaces 12b on the forward rotation direction side of the teeth 12 on the right side of the sprocket 10 come into contact with the engaging planes 22b on the right side of the cores 22, and thereby, the cores 22 of the elastic crawler 20 are engaged with the teeth 12 of the sprocket 10. In this way, the rotation of the sprocket 10 can be transferred to the elastic crawler 20. Namely, the sprocket 10 is capable of transferring the driving force to the elastic crawler 20.

At this time, in the present embodiment, as illustrated with solid line in FIG. 3B, the tooth surfaces $F_1$ of the teeth 12 of the sprocket 10 and the engaging surfaces $F_2$ of the cores 22 of the elastic crawler 20 form the gaps C on the sides closer to the tooth bottom surfaces 11a of the sprocket 10 than the contact portions P. Therefore, when the elastic crawler 20 is wound onto the sprocket 10, the teeth 12 of the sprocket 10 and the cores 22 do not contact on the sides closer to the tooth bottom surfaces 11a of the sprocket 10 than the contact portions P.

As the sprocket 10 further rotates, when the winding of the elastic crawler 20 is released from the sprocket 10 on the lower side of the sprocket 10 (omitted in the drawing), i.e., when the engaging tooth surfaces 12b of the sprocket 10 and the engaging planes 22b of the cores 22 are engaged and then the cores 22 are removed from the tooth grooves of the sprocket 10, the cores 22 follow tracks opposite to the arrow $d_1$ along the involute curves. Therefore, when the winding of the elastic crawler 20 is released from the sprocket 10, since the gaps C are formed on the sides closer to the tooth bottom surfaces 11a of the sprocket 10 than the contact portions P, the sprocket 10 and the cores 22 do not contact on the side closer to the tooth bottom surfaces 11a of the sprocket 10 than the contact portions P.

On the other hand, in FIGS. 2 and 3, by rotating the sprocket 10 in the direction opposite to the forward rotation direction D (the backward rotation direction), the effect is similar as in the case of driving the elastic crawler 20 in the backward direction.

In this way, according to the elastic crawler drive mechanism 100 according to the present embodiment, the cores 22 of the elastic crawler 20 have flat surfaces (engaging planes) 22b in contact with a part of the tooth surfaces $F_1$ of the teeth of the sprocket 10, and therefore, when the cores 22 of the elastic crawler 20 are engaged with and released from the teeth 12 of the sprocket 10, the cores 22 can roll and contact with the tooth surfaces $F_1$ of the teeth 12 of the sprocket 10 without sliding contact. In addition, since the teeth 12 of the sprocket 10 and the cores 22 of the elastic crawler 20 form the gaps C on the sides closer to the tooth bottom surfaces 11a of the sprocket 10 than the contact portions P, the corner surfaces 22d of the cores 22 do not contact with the teeth 12 of the sprocket 10, which enables prevention of hooking and sliding contact on the sides closer to the tooth bottom surfaces 11a of the sprocket 10 than the contact portions P.

Therefore, according to the elastic crawler drive mechanism 100 according to the present embodiment, the durability is excellent due to suppression of abrasion occurrence of the sprocket 10 and the elastic crawler 20.

In the present embodiment, within the tooth surfaces $F_1$ of the teeth 12 of the sprocket 10, the sides closer to the tooth bottom surfaces 11a than the contact portions P are curved surfaces (tooth root surfaces 12a) recessed toward the inner sides. In this case, by adjusting the shapes, sizes, etc. of the tooth surfaces $F_1$ (tooth root surfaces 12a) of the teeth 12 of the sprocket 10, it is possible to form the gaps C. In particular, if the tooth root surfaces 12a of the teeth 12 of the sprocket 10 are of a shape with wide end toward the tooth bottom surfaces 11a as described in the present embodiment, it is possible to ensure the gaps C and simultaneously improve the strength of the teeth 12. Here, the tooth root surfaces 12a of the teeth 12 of the sprocket 10 may be curved surfaces protruding to the outer sides of the teeth 12, but if curved surfaces protruding to the inner sides of the teeth 12 as described in the present embodiment, as mentioned below, it becomes easier to form the teeth 12.

In the present embodiment, the corner surfaces 22d of the cores 22 are curved surfaces protruding to the outer sides. In this case, it is possible to form the gaps C by adjusting the shapes, sizes, etc. of the corner surfaces 22d of the cores 22. The gaps C may be formed by adjusting at least either one of the teeth 12 of the sprocket 10 and the corner surfaces 22d of the core 22, but it is preferably to adjust both the teeth 12 of the sprocket 10 and the corner surfaces 22d of the core 22 as described in the present embodiment.

In the present embodiment, the tooth surfaces $F_1$ of the teeth 12 of the sprocket 10 are curved surfaces (engaging tooth surfaces 12b) of which the sides closer to the tooth top surfaces 12c than the contact portions P protrude toward the outer sides. In this case, the cores 22 can easily roll and contact with the engaging tooth surfaces 12b of the sprocket 10, and thus the abrasion prevention of the cores 22 of the elastic crawler 20 and the teeth 12 of the sprocket 10 becomes more effective.

In the present embodiment, the tooth top surfaces 12c of the teeth 12 of the sprocket 10 are curved surface protruding toward the outer sides. In this case, the tooth tops of the sprocket 10 and the cores 22 of the elastic crawler 20 become unlikely to interfere with each other, and even in the case of interference, the cores 22 can easily roll and contact with the engaging tooth surfaces 12b of the sprocket 10. Therefore, the abrasion prevention of the cores 22 of the elastic crawler 20 and the teeth 12 of the sprocket 10 becomes effective.

According to the above, the elastic crawler drive mechanism 100 according to the present embodiment is an elastic crawler drive mechanism excellent in durability due to suppression of abrasion occurrence of the sprocket 10 and the elastic crawler 20.

Figure 4A:
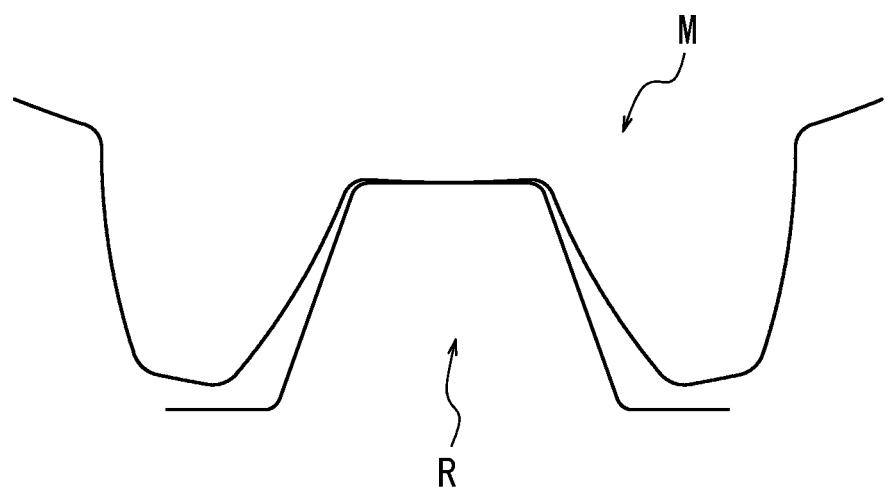
FIG. 4A is a schematic side view showing a part of the material and the rack used in the generative method.
Figure 4B:
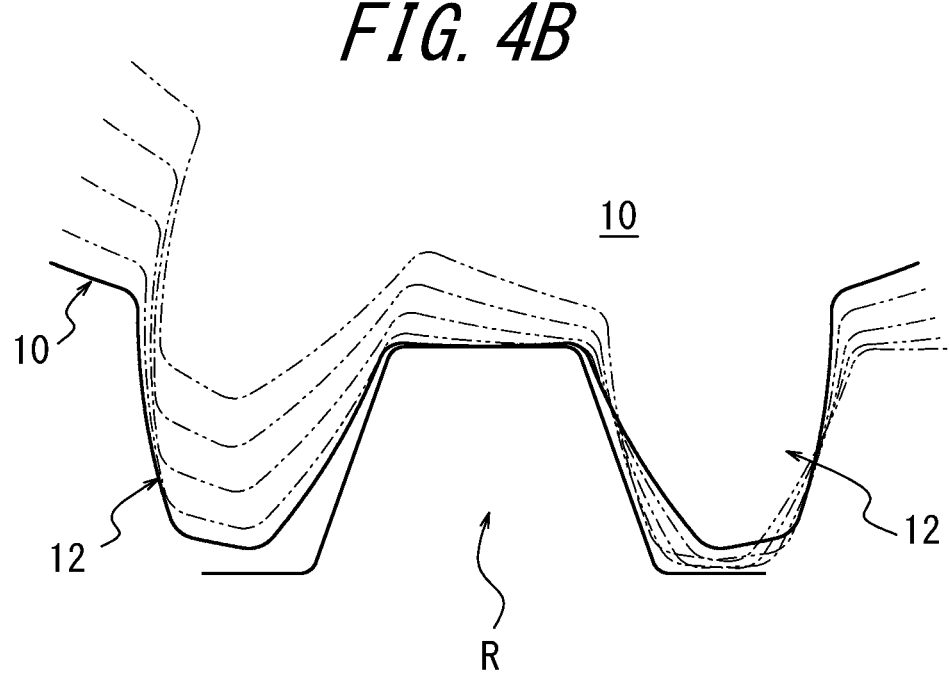
FIG. 4B is a schematic side view showing a track when the material rotates on the rack when the tooth shape is generated.

As illustrated in FIGS. 4A and 4B, the tooth shapes of the teeth 12 of the sprocket 10 used in the elastic crawler drive mechanism 100 according to the present embodiment can be formed via a generative method using a work material M and a standard rack R. In the present embodiment, as illustrated in FIG. 4A, it is possible to generate an involute tooth shape due to gear cutting of the rack R. In the elastic crawler drive mechanism 100 according to the present embodiment, at least a part of the tooth shape of the sprocket 10 is set to an involute tooth shape. In this case, via a simple method called gear cutting by using the rack R, it is possible to easily produce the tooth shape of the sprocket 10 according to the present invention, which is capable of effectively preventing abrasion.

In the following, Table 1 shows preferable first coefficient a and second coefficient b, and suitable tooth number according to the core opposite surface angle A of the cores 22. Here, with respect to the first coefficient a and the second coefficient b, an adjustment of around ±15% is permitted. Further, with respect to backlash, the tooth width is adjusted to 0.5% to 5% to the circular pitch.

TABLE 1

| Core opposite surface angle (°) | Coefficient a | Coefficient b | Suitable tooth number |
|---|---|---|---|
| 70 | 0.82 | 0.2 | 7- |
| 60 | 0.87 | 0.2 | 15- |
| 50 | 0.93 | 0.2 | 22- |

Mentioned above is no more than one embodiment of this disclosure, which may be varied to various modes according to Claims. For example, in the case where the rotation direction of the sprocket 10 is a constant direction, the tooth surfaces $F_1$ of the teeth 12 of the sprocket 10 and the engaging surfaces $F_2$ of the cores 22, etc. according to this disclosure may be used in either one of two tooth surfaces $F_1$ for forming the shape of one tooth 12, and an engaging surface $F_2$ of a core 22 corresponding thereto. Moreover, the present embodiment has a main cord layer 24 incorporated in the endless belt 21 of the elastic crawler 20, while a reinforcement layer including cords inclined with respect to the circumferential direction of the elastic crawler 20, etc. may be added, and the main cord layer 24 may be omitted. Further, according to this disclosure, by arranging a plurality of guides on the endless belt 21 of the elastic crawler 20 instead of the cores 22, and using these guides formed as elastic (rubber) protrusions as "engaging portions", it is possible to apply the same configuration as the cores 22. The materials for forming the engaging portions are not limited to the aforementioned materials. For example, cores made of resin may be used as the cores as well.

INDUSTRIAL APPLICABILITY

This disclosure may be used in an elastic crawler drive mechanism comprising an elastic crawler with a plurality of engaging portions disposed on an endless belt with elasticity, and a sprocket having a plurality of teeth engageable with the engaging portions of the elastic crawler.

REFERENCE SIGNS LIST 10 sprocket
11 disk
11a tooth bottom surface 12 tooth
12a tooth root surface
12b engaging tooth surface
12c tooth top surface
20 elastic crawler
21 endless belt
22 core (engaging portion)
22a top surface
22b engaging plane
22d corner surface
23 penetrating hole
24 main cord layer
100 drive mechanism of elastic crawler
a first coefficient
b second coefficient
C gap
P contact portion
$r_a$ radius of curvature of tooth root surface
$r_b$ radius of curvature of tooth end surface
$r_c$ radius of curvature of tooth top surface
$r_d$ radius of curvature of corner surface
A core opposite surface angle
$F_1$ tooth surface
$F_2$ engaging surface
$O_1$ central line of tooth
$O_2$ central line of core

The invention claimed is:

1. An elastic crawler drive mechanism, comprising an elastic crawler with a plurality of engaging portions disposed on an endless belt with elasticity, and a sprocket having a plurality of teeth engageable with the engaging portions of the elastic crawler, wherein:
the engaging portions of the elastic crawler have flat engaging planes in contact with a part of tooth surfaces of the sprocket when the engaging portions come into contact with tooth bottom surfaces of the sprocket, and
when the engaging portions are in contact with the tooth bottom surfaces, and simultaneously the engaging planes of the engaging portions are in contact with the tooth surfaces of the sprocket, the tooth surfaces of the sprocket and the engaging planes of the engaging portions form gaps between the tooth surfaces of the sprocket and the engaging planes of the engaging portions, on sides closer to the tooth bottom surfaces of the sprocket than contact portions of the engaging planes of the engaging portions and the tooth surfaces of the sprocket,
wherein the gaps enable the teeth of the sprocket and the engaging portions of the elastic crawler not to contact on the sides closer to the tooth bottom surfaces of the sprocket than the contact portions, from winding of the elastic crawler onto the sprocket to releasing of the elastic crawler from the sprocket.

2. The elastic crawler drive mechanism according to claim 1, wherein: the sides of the tooth surfaces of the sprocket closer to the tooth bottom surfaces than the contact portions are curved surfaces recessed to inner sides.

3. The elastic crawler drive mechanism according to claim 2, wherein: corner portions of the engaging portions adjacent to tooth root portions of the sprocket are curved surfaces.

4. The elastic crawler drive mechanism according to claim 3, wherein: sides of the tooth surfaces of the sprocket closer to tooth top surfaces than the contact portions are curved surfaces protruding to outer sides.

5. The elastic crawler drive mechanism according to claim 3, wherein: tooth top surfaces of the sprocket are curved surfaces protruding to outer sides.

6. The elastic crawler drive mechanism according to claim 3, wherein: at least a part of a tooth shape of the sprocket is involute tooth shape.

7. The elastic crawler drive mechanism according to claim 2, wherein: sides of the tooth surfaces of the sprocket closer to tooth top surfaces than the contact portions are curved surfaces protruding to outer sides.

8. The elastic crawler drive mechanism according to claim 7, wherein: the tooth top surfaces of the sprocket are curved surfaces protruding to outer sides.

9. The elastic crawler drive mechanism according to claim 2, wherein: tooth top surfaces of the sprocket are curved surfaces protruding to outer sides.

10. The elastic crawler drive mechanism according to claim 2, wherein: at least a part of a tooth shape of the sprocket is involute tooth shape.

11. The elastic crawler drive mechanism according to claim 1, wherein: corner portions of the engaging portions adjacent to tooth root portions of the sprocket are curved surfaces.

12. The elastic crawler drive mechanism according to claim 11, wherein: sides of the tooth surfaces of the sprocket closer to tooth top surfaces than the contact portions are curved surfaces protruding to outer sides.

13. The elastic crawler drive mechanism according to claim 11, wherein: tooth top surfaces of the sprocket are curved surfaces protruding to outer sides.

14. The elastic crawler drive mechanism according to claim 11, wherein: at least a part of a tooth shape of the sprocket is involute tooth shape.

15. The elastic crawler drive mechanism according to claim 1, wherein: sides of the tooth surfaces of the sprocket closer to tooth top surfaces than the contact portions are curved surfaces protruding to outer sides.

16. The elastic crawler drive mechanism according to claim 15, wherein: the tooth top surfaces of the sprocket are curved surfaces protruding to outer sides.

17. The elastic crawler drive mechanism according to claim 15, wherein: at least a part of a tooth shape of the sprocket is involute tooth shape.

18. The elastic crawler drive mechanism according to claim 1, wherein: tooth top surfaces of the sprocket are curved surfaces protruding to outer sides.

19. The elastic crawler drive mechanism according to claim 18, wherein: at least a part of a tooth shape of the sprocket is involute tooth shape.

20. The elastic crawler drive mechanism according to claim 1, wherein: at least a part of a tooth shape of the sprocket is involute tooth shape.

21. The elastic crawler drive mechanism according to claim 1, wherein tooth root surfaces of the sprocket respectively have an outer shape of a curved surface.

* * * * *